United States Patent
Kang et al.

(10) Patent No.: US 8,296,135 B2
(45) Date of Patent: Oct. 23, 2012

(54) NOISE CANCELLATION SYSTEM AND METHOD

(75) Inventors: Byung Ok Kang, Daejeon (KR); Ho-Young Jung, Daejeon (KR); Sung Joo Lee, Daejeon (KR); Yunkeun Lee, Daejeon (KR); Jeon Gue Park, Daejeon (KR); Jeom Ja Kang, Daejeon (KR); Hoon Chung, Daejeon (KR); Euisok Chung, Daejeon (KR); Ji Hyun Wang, Daejeon (KR); Hyung-Bae Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1012 days.

(21) Appl. No.: 12/270,218

(22) Filed: Nov. 13, 2008

(65) Prior Publication Data

US 2009/0265168 A1    Oct. 22, 2009

(30) Foreign Application Priority Data

Apr. 22, 2008  (KR) .................. 10-2008-0037221
Aug. 1, 2008   (KR) .................. 10-2008-0075653

(51) Int. Cl.
    *G10L 21/02*    (2006.01)
(52) U.S. Cl. ........ 704/226; 704/233; 704/228; 704/219; 704/256.8; 381/92; 381/94.2; 381/94.3
(58) Field of Classification Search .......... 704/226–228, 704/233, 219, 225, 236, 234, 256.8; 381/92, 381/94.2, 94.1, 94.3, 94.7, 71.8, 13; 375/260, 375/227
See application file for complete search history.

(56) References Cited

U.S. PATENT DOCUMENTS

| | | | | |
|---|---|---|---|---|
| 4,649,505 | A * | 3/1987 | Zinser et al. | 379/406.08 |
| 7,463,672 | B2 * | 12/2008 | Monsen | 375/147 |
| 7,864,717 | B2 * | 1/2011 | Dorr | 370/267 |
| 2004/0078199 | A1 * | 4/2004 | Kremer et al. | 704/233 |

(Continued)

FOREIGN PATENT DOCUMENTS

KR    10-2003-0078218    10/2003

OTHER PUBLICATIONS

Korean Office Action for Korean application No. 10-2008-0075653, citing the attached references.

(Continued)

*Primary Examiner* — Vijay B Chawan
(74) *Attorney, Agent, or Firm* — Lowe Hauptman Ham & Berner, LLP

(57) ABSTRACT

A noise cancellation apparatus includes a noise estimation module for receiving a noise-containing input speech, and estimating a noise therefrom to output the estimated noise; a first Wiener filter module for receiving the input speech, and applying a first Wiener filter thereto to output a first estimation of clean speech; a database for storing data of a Gaussian mixture model for modeling clean speech; and an MMSE estimation module for receiving the first estimation of clean speech and the data of the Gaussian mixture model to output a second estimation of clean speech. The apparatus further includes a final clean speech estimation module for receiving the second estimation of clean speech from the MMSE estimation module and the estimated noise from the noise estimation module, and obtaining a final Wiener filter gain therefrom to output a final estimation of clean speech by applying the final Wiener filter gain.

8 Claims, 2 Drawing Sheets

U.S. PATENT DOCUMENTS

| | | | |
|---|---|---|---|
| 2006/0206320 A1* | 9/2006 | Li | 704/226 |
| 2007/0033020 A1* | 2/2007 | (Kelleher) Francois et al. | 704/226 |
| 2007/0055506 A1* | 3/2007 | Bollano et al. | 704/226 |
| 2007/0172073 A1* | 7/2007 | Jang et al. | 381/71.1 |
| 2007/0250312 A1* | 10/2007 | Garner | 704/230 |
| 2007/0255535 A1* | 11/2007 | Marro et al. | 702/194 |
| 2008/0140395 A1* | 6/2008 | Yeldener | 704/226 |
| 2008/0306734 A1* | 12/2008 | Ichikawa | 704/226 |
| 2009/0067642 A1* | 3/2009 | Buck et al. | 381/94.1 |

OTHER PUBLICATIONS

Takayuki Arakawa et al.; "Model-Based Wiener Filter for Noise Robust Speech Recognition"; ICASSP 2006, vol. 1; pp. 537-540.

ETSI; "Distributed speech recognition; Advanced front-end feature extraction algorithm; Compression algorithms"; ETSI ES 202 050 v1.1.5; Jan. 2007; pp. 9-15.

Byung-Ok Kang et al.; "Model Based Wiener Filter for Processing Dynamic Noise"; The Korean Society of Phonetic Sciences and Speech Technology; Nov. 16, 2007; 10 pages.

* cited by examiner

NOISE CANCELLATION SYSTEM AND METHOD

CROSS-REFERENCE(S) TO RELATED APPLICATION

The present invention claims priorities of Korean Patent Application No. 10-2008-0037221 filed on Apr. 22, 2008 and Korean Patent Application No. 10-2008-0075653 filed on Aug. 1, 2008, which are incorporated herein by reference.

FIELD OF THE INVENTION

The present invention generally relates to a technology for recognizing speech in a noisy environment; and, more particularly, to a noise cancellation apparatus and method using a model-based Wiener filter for estimating a de-noised clean speech from an input speech.

This work was supported by the IT R&D program of MIC/ IITA [2006-S-036-03, Development of voice interface of large-capacity conversational distributed processing for new growth engine].

BACKGROUND OF THE INVENTION

A main obstacle in commercial use of speech recognition technologies is a reduced recognition performance caused by noise.

Even a speech recognition system having a substantially perfect performance in a noise-free environment is occasionally low in recognition performance in an actual environment containing noise.

In order to solve such a problem, various approaches have been suggested so far. Typical methods include a spectral enhancement method based on signal processing and an adaptation method based on statistical modeling. In the spectral enhancement method, a noise spectrum is estimated in a speech-free interval, and thus estimated noise spectrum is subtracted from a spectrum of a noise-containing input signal. Spectrum subtraction method and decision-directed Wiener filter method have been widely used as the spectral enhancement method based on signal processing. Among these, the decision-directed Wiener filter method, in which the Wiener filter is extended into a two-stage form, is adopted as ETSI advanced front-end (AFE) standard. It is well known that the Wiener filter using the decision-directed approach is particularly effective in canceling stationary noise.

On the other hand, the model adaptation method adjusts an acoustic model (usually Hidden Markov Model) according to the noise situation instead of adjusting input noise signals. A typical model adaptation method based on statistical modeling is parallel model compensation (PMC) technique. In the PMC technique, clean speech and noise are respectively represented as two different models, and then the two models are combined to model a noise-containing speech. The PMC technique shows a better performance than other methods when the noisy environment is anticipated by the noise models.

Hereinafter, a noise cancellation apparatus and method using a conventional Wiener filter will be described.

FIG. 1 is a block diagram of a conventional Wiener filter module 100 that serves as a noise cancellation apparatus using a Wiener filter. The conventional Wiener filter module 100 includes a spectrum estimation module 101, a power spectral density (PSD) mean estimation module 102, a speech/non-speech estimation module 103, a Wiener filter design module 104 and a Wiener filtering module 105.

As illustrated therein, after the spectrum estimation module 101 receives an input speech $S_{in}$ to estimate therefrom the frequency representation of each frame, the PSD mean estimation unit 102 estimates a power spectral density mean in the smoothed form from the estimated spectra, the speech/non-speech estimation module 103 estimates noise frequency characteristics in the latest non-speech frame from the estimations in speech and non-speech frames.

The Wiener filter design module 104 receives, for example, the estimated spectrum from spectrum estimation module 101, the PSD mean from PSD mean estimation unit 102 and the noise frequency characteristics from speech/non-speech estimation module 103 to thereby obtain a Wiener filter for the current frame using the estimated noise frequency characteristics. Thereafter, the Wiener filtering module 105 applies the Wiener filter to estimate a clean speech (i.e., speech from which noise has been canceled), thereby producing the estimated clean speech $S_{out}$.

In this manner, the noise characteristics are estimated for the latest non-speech frame by the noise cancellation apparatus and method based on the conventional Wiener filter. Thus, the Wiener filter suitable for the input speech $S_{in}$ is computed therefrom, and the estimated clean speech $S_{out}$ is provided by applying the computed Wiener filter.

However, the conventional Wiener filter has a drawback in that its performance is limited in such environments where noise characteristics keep changing with time or various kinds of noises are mixed up.

SUMMARY OF THE INVENTION

In view of the above, the present invention provides a noise cancellation apparatus and method that enable a speech recognition system to enhance speech recognition performance in actual noisy environments by effectively reducing dynamic noise by combining the spectral enhancement method based on signal processing with the adaptation method based on statistical modeling.

In accordance with one aspect of the present invention, there is provided a noise cancellation apparatus including a noise estimation module for receiving a noise-containing input speech, and estimating a noise therefrom to output the estimated noise; a first Wiener filter module for receiving the input speech, and applying a first Wiener filter thereto to output a first estimation of clean speech; a database for storing data of a Gaussian mixture model for modeling clean speech; an MMSE estimation module for receiving the first estimation of clean speech and the data of the Gaussian mixture model to output a second estimation of clean speech; and a final clean speech estimation module based on a final Wiener gain design for receiving the second estimation of clean speech from the MMSE estimation module and the estimated noise from the noise estimation module, and obtaining the final Wiener filter gain therefrom to output a final estimation of clean speech by applying the final Wiener filter gain.

In accordance with another aspect of the present invention, there is provided a noise cancellation method including the following: receiving a noise-containing input speech; estimating a noise from the input speech to output the estimated noise; obtaining a first Wiener filter from the input speech; producing a first estimation of clean speech by applying the first Wiener filter; producing a second estimation of clean speech from the first estimation of clean speech and data of a Gaussian mixture model for modeling clean speech; obtaining a final Wiener filter gain from the second estimation of clean speech and the estimated noise; and producing a final estimation of clean speech by applying the final Wiener filter gain.

In accordance with the apparatus and method for reducing dynamic noise of the present invention, a speech recognition system can improve its recognition performance to estimate clean speech with a higher accuracy especially in such environments where dynamic noise exists and/or various kinds of noises are mixed up.

BRIEF DESCRIPTION OF THE DRAWINGS

The above features of the present invention will become apparent from the following description of embodiments given in conjunction with the accompanying drawings, in which.

DETAILED DESCRIPTION OF THE EMBODIMENT

Hereinafter, an embodiment of the present invention will be described in detail with reference to the accompanying drawings, which form a part hereof. Detailed descriptions of well-known functions and structures incorporated herein may be omitted to avoid obscuring the subject matter of the present invention.

Figure 2:
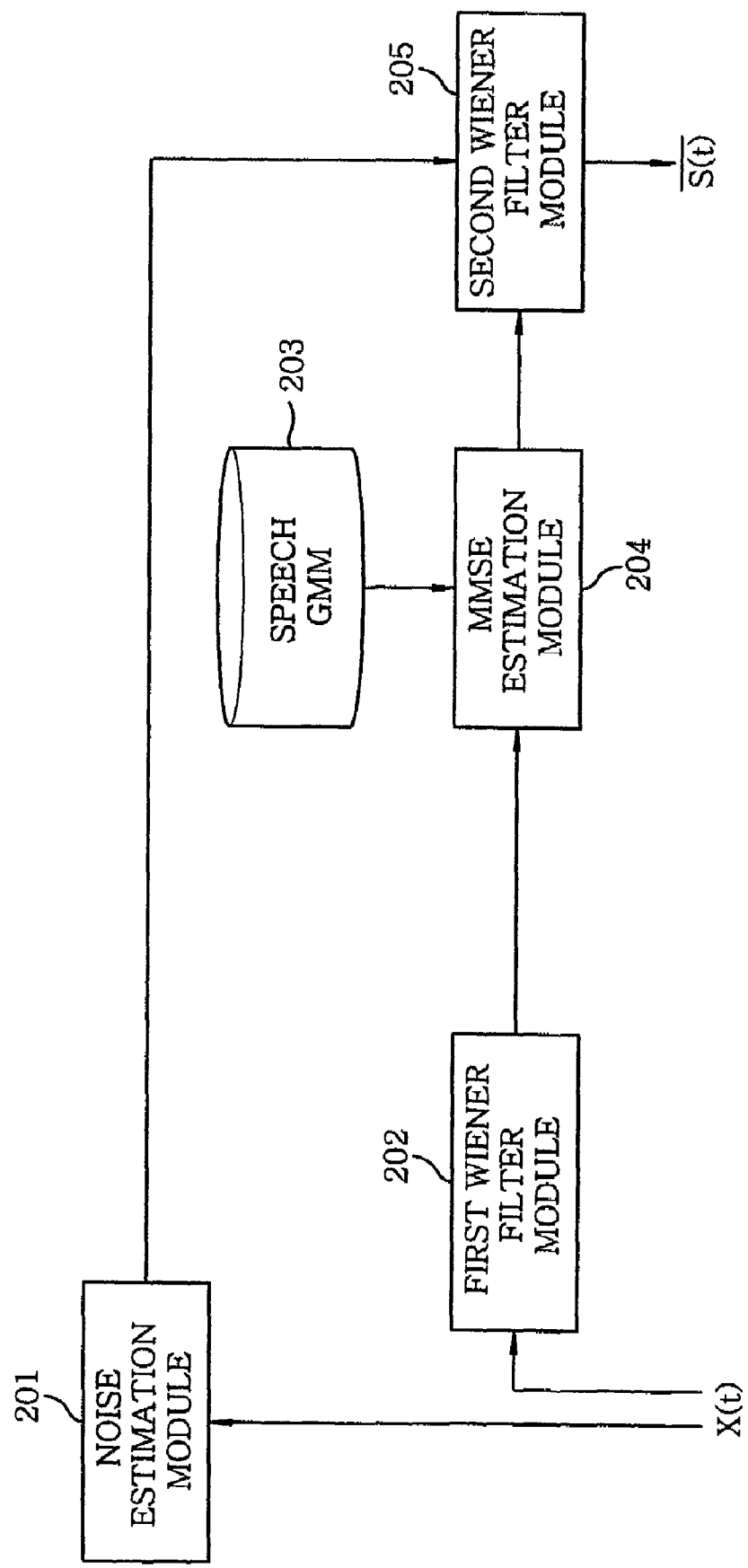
FIG. 2 is a block diagram illustrating a noise cancellation apparatus using a model-based Wiener filter in accordance with an embodiment of the present invention.

FIG. 2 is a block diagram illustrating a noise cancellation apparatus using a model-based Wiener filter in accordance with an embodiment of the present invention.

As illustrated therein, the noise cancellation apparatus in accordance with the present embodiment includes a noise estimation module 201, a first Wiener filter module 202, a GMM (Gaussian mixture model) database 203, an MMSE (Minimum Mean Square Error) estimation module 204 and a final clean speech estimation module (which is a second Wiener filter module) 205.

A speaker's speech signal that contains noise is inputted as an input signal to the noise cancellation apparatus of the present embodiment. The noise-containing speech signal X(t) is expressed by the following Eq. 1.

$$X(t) = S(t) + N(t) \quad \text{(Eq. 1)}$$

where X(t) is the noise-containing speech signal, S(t) is a clean speech signal, and N(t) is a noise signal.

Then, the noise estimation module 201 receives the speech signal X(t) to calculate an estimation value $\overline{N(t)}$ of the noise signal in the current frame. Specifically, the noise estimation module 201 calculates the estimation value $\overline{N(t)}$ based on VAD (Voice Activity Detection) scheme.

Meanwhile, the input signal is also inputted to the first Wiener filter module 202 that is, for example, configured same as the conventional Wiener filter module 100 as described above. Then, the first Wiener filter module 202 calculates a spectrum estimation of clean speech by the noise cancellation method shown in FIG. 1 to thereby output a first estimation $S_o(t)$ of clean speech.

Specifically, after the first Wiener filter module 202 receives the input signal, the spectrum estimation module 101 estimates from the speech signal X(t) the frequency representation of each frame. Then, the PSD mean estimation unit 102 estimates a power spectral density mean in the smoothed form from the estimated spectra. Further, the speech/non-speech estimation module 103 estimates noise frequency characteristics in the latest non-speech frame from estimations in speech and non-speech frames.

Then, the Wiener filter design module 104 receives, for example, the estimated spectrum from spectrum estimation module 101, the mean spectrum from PSD mean estimation unit 102 and the noise frequency characteristics from speech/non-speech estimation module 103 to thereby obtain a first Wiener filter for the current frame using the estimated noise frequency characteristics. Thereafter, the Wiener filtering module 105 applies the first Wiener filter to estimate clean speech, thereby outputting the first estimation $S_o(t)$ of clean speech to the MMSE estimation module 204.

The Gaussian mixture model (GMM) database 203 stores data for modeling clean speech obtained in advance from a sufficient amount of speech data. Assuming that the GMM has K mixtures, the GMM is specified by the following Eq. 2.

$$P(s) = \sum_k^K p(k) N(s; \mu_k; \Sigma_k) \quad \text{(Eq. 2)}$$

where K is the number of Gaussian mixtures, p(k) denotes the probability of being a k-th Gaussian mixture, $N(s; \mu_k; \Sigma_k)$ denotes the k-th Gaussian mixture, s denotes input variable of the GMM, $\mu_k$ denotes mean vector, and $\Sigma_k$ denotes covariance matrix.

Figure 1:
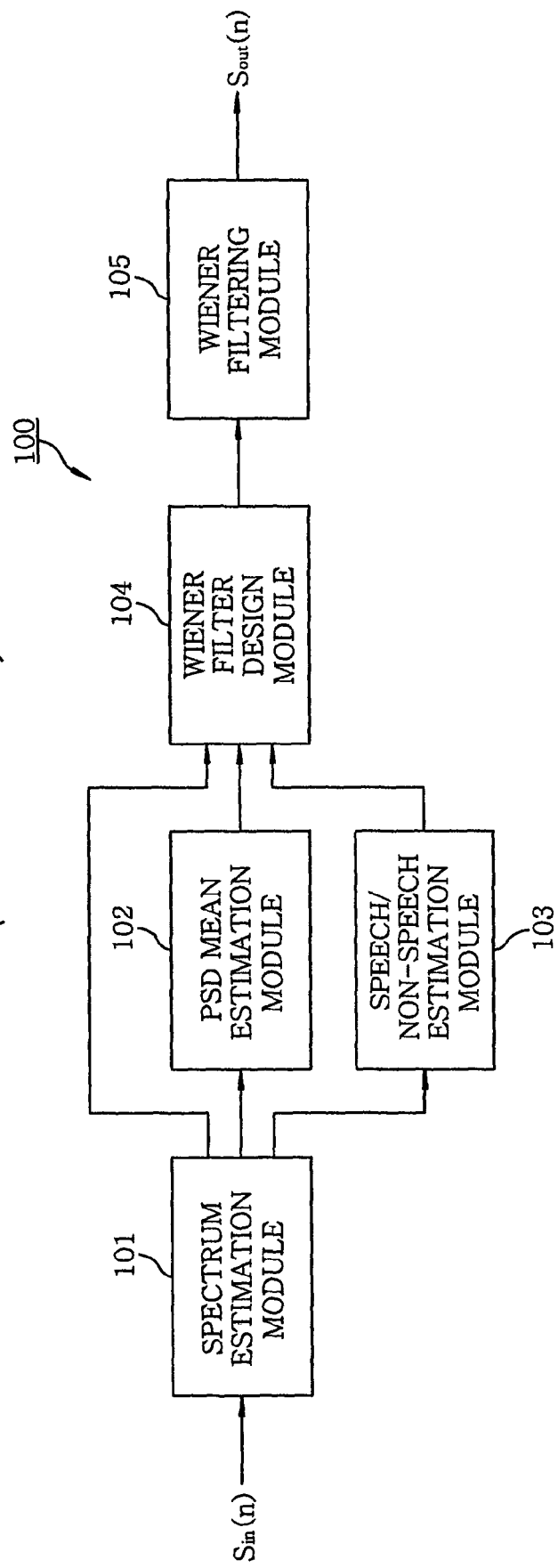
FIG. 1 is a block diagram of a conventional Wiener filter module that serves as a noise cancellation apparatus using a Wiener filter.

The GMM database 204 may be constructed on the basis of the PSD mean obtained by the PSD mean estimation unit 102 shown in FIG. 1 from collected training data of clean speech.

Then, the MMSE estimation module 204 receives the first estimation $S_o(t)$ of clean speech produced from the first Wiener filter module 202 and the data of the GMM database 203 to output a second estimation $\overline{<S(t)>}$ of clean speech by applying the minimum mean square error (MMSE) method. In order to obtain the second estimation $\overline{<S(t)>}$ of clean speech, the MMSE estimation module 204 first calculates for the first estimation $S_o(t)$ a posterior probability of being a k-th Gaussian mixture.

Herein, the a posterior probability of the first estimation $S_o(t)$ being a k-th Gaussian mixture is obtained by the following Eq. 3.

$$P(k \mid \hat{S}_0(t)) = \frac{P(k)P(\hat{S}_0(t) \mid k)}{\sum_{i=1}^{K} P(k)P(\hat{S}_0(t) \mid k)} \quad \text{(Eq. 3)}$$

Then, the MMSE estimation module 204 calculates the second estimation $\overline{<S(t)>}$ of clean speech by the following Eq. 4 based on the MMSE method using the a posterior probability obtained as above and the average probability of the current frame being each of the Gaussian mixtures.

$$\overline{<S(t)>} = \sum_k^K P(k \mid \hat{S}_0(t)) \mu_k \quad \text{(Eq. 4)}$$

Thereafter, the final clean speech estimation module 205 applies the estimation value $\overline{N(t)}$ of the noise signal (that has been obtained by the noise estimation module 202), the first estimation $S_o(t)$ of clean speech (that has been calculated by the first Wiener filter module 202) and the second estimation $\overline{<S(t)>}$ of clean speech (that has been calculated by the MMSE estimation module 204) to the following Eq. 5 and Eq. 6 to obtain a final Wiener filter gain W(t).

$$W(t) = \frac{\eta(t)}{\eta(t)+1} \quad \text{(Eq. 5)}$$

$$\eta(t) = \beta \frac{\hat{S}_0(t)}{\overline{N(t)}} + (1-\beta)\frac{\overline{<S(t)>}}{\overline{N(t)}} \quad \text{(Eq. 6)}$$

where η(t) represents a priori SNR (Signal to Noise Ratio), and β represents smoothing parameter.

Finally, the final clean speech estimation module 205 produces a final estimation $\overline{S(t)}$ of the clean speech by computing convolution of the above-obtained Wiener gain W(t) and the speech signal X(t) as expressed in the following Eq. 7.

$$\overline{S(t)} = W(t) * X(t) \quad \text{(Eq. 7)}$$

In this manner, in accordance with the present embodiment of the invention, the final estimation $\overline{S(t)}$ of the clean speech can be obtained by the final clean speech estimation module 205 from the speech signal X(t).

While the invention has been shown and described with respect to the embodiment, it will be understood by those skilled in the art that various changes and modification can be made without departing from the scope of the invention as defined in the following claims.

What is claimed is:

1. A noise cancellation apparatus comprising:
   a noise estimation module for receiving a noise-containing input speech, and estimating a noise therefrom to output the estimated noise;
   a first Wiener filter module for receiving the input speech, and applying a first Wiener filter thereto to output a first estimation of clean speech;
   a database for storing data of a Gaussian mixture model for modeling clean speech;
   an minimum mean square error estimation module for receiving the first estimation of clean speech and the data of the Gaussian mixture model to output a second estimation of clean speech; and
   a final clean speech estimation module for receiving the second estimation of clean speech from the minimum mean square error estimation module and the estimated noise from the noise estimation module, and obtaining a final Wiener filter gain therefrom to output a final estimation of clean speech by applying the final Wiener filter gain.

2. The noise cancellation apparatus of claim 1, wherein the noise estimation module obtains the estimated noise by using a statistical voice activity detection scheme.

3. The noise cancellation apparatus of claim 1, wherein the Wiener filter module includes:
   means for calculating the first Wiener filter by estimating a frequency representation of each frame from the input speech, estimating noise frequency characteristics in a non-speech frame from estimations in speech and non-speech frames, and obtaining the first Wiener filter using the estimated noise frequency characteristics; and
   means for producing the first estimation of clean speech by applying the first Wiener filter.

4. The noise cancellation apparatus of claim 1, wherein the minimum mean square error estimation module includes:
   means for computing a posterior probability of the first estimation being a k-th Gaussian mixture among the data of the Gaussian mixture model; and
   means for computing the second estimation by using the a posterior probability and an average probability of a current frame being each of the Gaussian mixtures.

5. The noise cancellation apparatus of claim 1, wherein spectra are estimated from collected data of clean speech, and the database is constructed by a spectral density mean estimated from the estimated spectra.

6. A noise cancellation method comprising:
   receiving a noise-containing input speech;
   estimating a noise from the input speech to output the estimated noise;
   obtaining a first Wiener filter from the input speech;
   producing a first estimation of clean speech by applying the first Wiener filter;
   producing a second estimation of clean speech from the first estimation of clean speech and data of a Gaussian mixture model for modeling clean speech;
   obtaining a final Wiener filter gain from the second estimation of clean speech and the estimated noise; and
   producing a final estimation of clean speech by applying the final Wiener filter gain.

7. The noise cancellation method of claim 6, wherein the estimated noise is obtained by using a statistical voice activity detection scheme.

8. The noise cancellation method of claim 6, wherein producing the second estimation of clean speech includes:
   computing a posterior probability of the first estimation being a k-th Gaussian mixture among the data of the Gaussian mixture model; and
   computing the second estimation by using the a posterior probability and an average probability of a current frame being each of the Gaussian mixtures.

* * * * *